No. 861,805. PATENTED JULY 30, 1907.
H. B. CAMP.
CLUTCH OPERATING DEVICE.
APPLICATION FILED DEC. 19, 1906.

2 SHEETS—SHEET 1.

Witnesses
Inventor
Horace B. Camp
by C. E. Humphrey
Atty.

No. 861,805. PATENTED JULY 30, 1907.
H. B. CAMP.
CLUTCH OPERATING DEVICE.
APPLICATION FILED DEC. 19, 1906.

2 SHEETS—SHEET 2.

Inventor,
Horace B. Camp.
by C. E. Humphrey.
Atty.

Witnesses:

UNITED STATES PATENT OFFICE.

HORACE BRAINERD CAMP, OF AKRON, OHIO.

CLUTCH-OPERATING DEVICE.

No. 861,805.  Specification of Letters Patent.  Patented July 30, 1907.

Application filed December 19, 1906. Serial No. 348,582.

*To all whom it may concern:*

Be it known that I, HORACE BRAINERD CAMP, a citizen of the United States, residing at Akron, in the county of Summit and State of Ohio, have invented new and useful Improvements in Clutch-Operating Devices, of which the following is a specification.

This invention relates to power devices for operating clutches and similar mechanisms, and the object thereof is to provide a simple and effectual device which may be utilized to operate clutches and like instrumentalities where the power required is too great for manual operation, or the position of the device to be operated is such that it cannot be readily reached.

With the foregoing and other objects in view, the invention consists in the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 1:
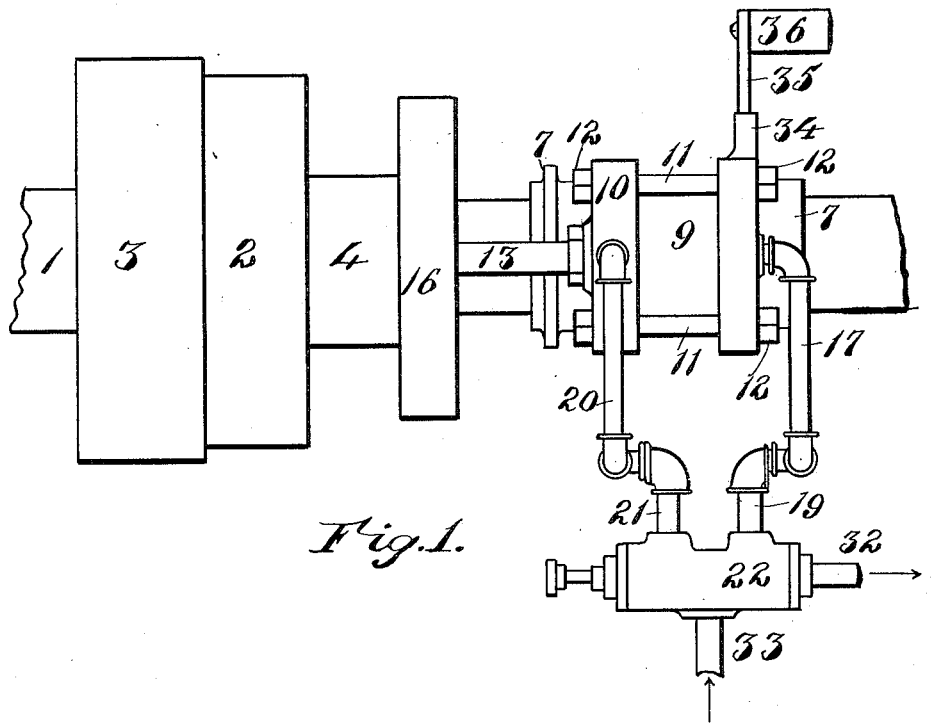
Figure 2:
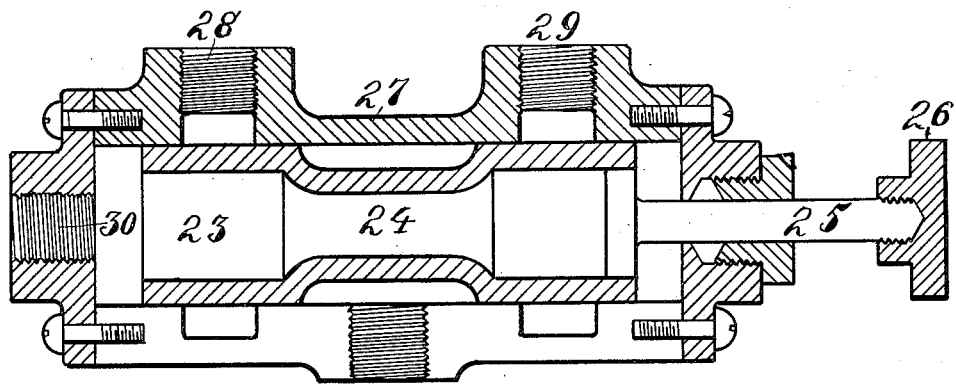
Figure 3:
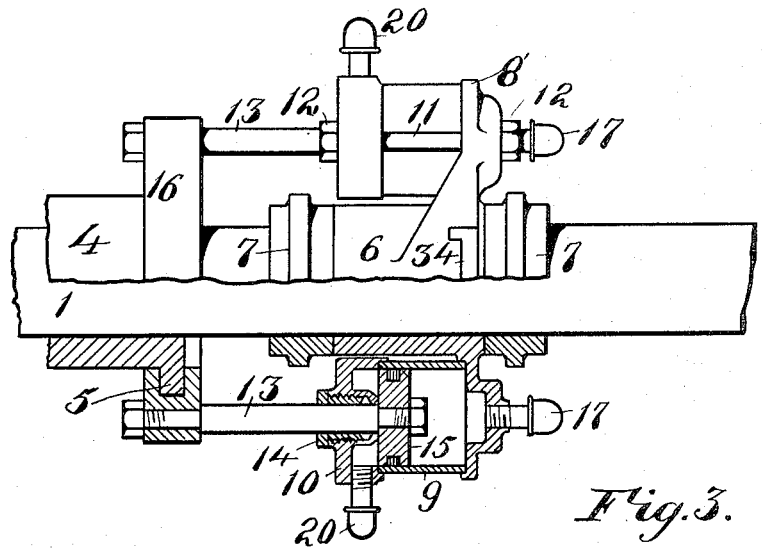
Figure 4:
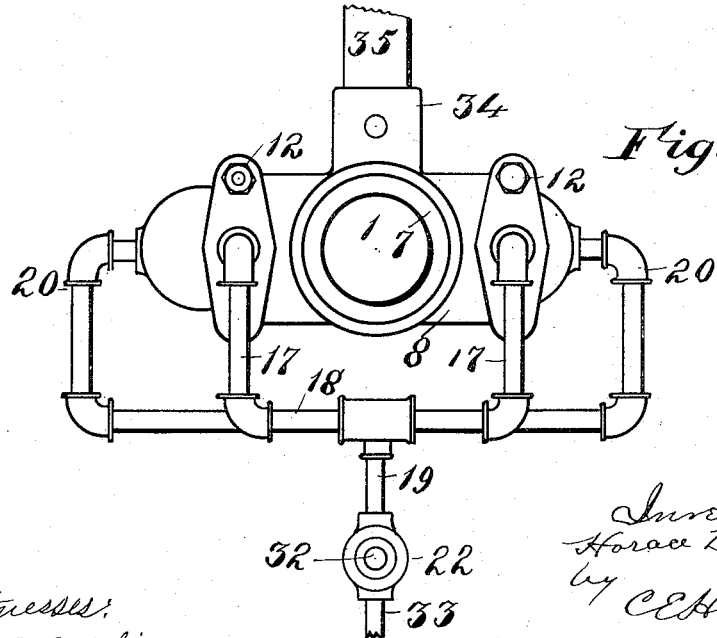

In the drawings, in which similar reference numerals indicate like parts in the different figures: Figure 1 is a side elevation of my improved device in connection with a friction clutch; Fig. 2 is a longitudinal sectional view of the valve employed in this device;
Fig. 3 is a plan of this device with a portion thereof in section to better illustrate the construction thereof; and, Fig. 4 is an end elevation looking from the right of Fig. 1.

In the description hereinafter given, the adaptability of my device for the operation of clutches will be used as a means for illustrating the construction and operation thereof.

In the drawings, the reference numeral 1 designates a shaft from which it is desired to communicate power to some other mechanism. On this shaft is mounted a clutch of any preferred type, designated in the drawings by the reference numeral 2, the loose member of which is secured to a pulley 3. A belt may be used to transfer power from this pulley 3 to any other mechanism. The mechanism of the clutch is connected with my device by means of a slidable-sleeve 4 provided with a flanged end 5; but any other suitable means may be employed to connect this device with the mechanism which is to be operated thereby, any changes of this character being entirely within the scope of the invention.

Freely mounted on the shaft 1 is a member 6 secured against longitudinal motion by means of two fixed collars 7. Projecting from opposite sides of the member 6 are two brackets 8 having in one of each of their faces circular recesses in which is placed a cylinder 9. The opposite ends of the cylinders 9 are closed by heads 10. These heads 10 are held in position by bolts 11 passing through both the heads 10 and brackets 8 and provided on the outside thereof with nuts 12. Through the heads 10 are piston rods 13 provided with ordinary stuffing boxes 14 and bearing on their inner ends within the cylinder 9, pistons 15. These piston rods 13 are connected at their outer ends to a yoke 16 which incloses the flanged end 5 of the sleeve 4 so that any motion communicated to the pistons 15 will cause a corresponding motion of the sleeve 4 which operates the clutch. Any suitable fluid may be used for operating these pistons and it is conveyed thereto and withdrawn therefrom through the following arrangement of pipes: From suitable openings in the brackets 8 extend pipes 17 which are connected to a single pipe 18, from which, by any suitable arrangement of pipes, extends a pipe 19. From suitable openings in the heads 10 extend a similar system of pipes, designated in the drawings by the reference numeral 20 and eventually uniting in a common pipe 21. Connected with the pipes 19 and 21 and referred to generally by the reference numeral 22 is a valve. This valve, shown in longitudinal section in Fig. 2, consists of a central piston 23 provided with a narrowed central portion 24, and further provided with a stem 25, and knob 26 for manipulation. The casing of this valve consists of a cylinder 27 having four openings 28, 29, 30 and 31. The openings 28 and 29 are connected to the pipes 19 and 21 respectively. The opening 30 constitutes the exhaust and is preferably provided with an outlet pipe 32. The opening 31 is the inlet and is provided with a pipe 33. When the piston 27 is in the position shown in Fig. 2, the ports 28 and 29 are closed. If the piston is moved to the right the fluid from the inlet 31 can pass around the reduced portion 24 to the port 29 and from thence by the pipes already described to the rear portions of the cylinders 9. If the piston 23 is moved to the left the fluid from the inlet 31 will pass in the same manner to the port 28, and the exhaust from the cylinders will pass through the port 29 into the cavity of the casing 27 and through the interior of the piston 23 to the exhaust 30. It will be obvious that when the piston 23 is moved to the right the exhaust from the port 28 will pass around the end of the piston and escape through the exhaust 30. In order to prevent the revolution of the member 6 with the shaft 1 there is formed thereon an integral lug 34 to which is secured a bar 35 attached to some fixed object such as a beam or post, referred to in the drawings by the reference numeral 36.

It will be seen from the foregoing description that by a very slight effort in operating the valve 22, movement of the pistons and their connected mechanism may be accomplished and this will produce an operative force on the clutch-operating mechanism, commensurate with the size and capacity of the cylinders 9 and in proportion to the pressure of fluid supplied thereto.

What I claim and desire to secure by Letters Patent, is:—

1. The combination in a device of the class described, of a shaft, a clutch mounted thereon, a sustaining member inclosing said shaft and supported thereby, means to prevent longitudinal movement of said member, means to prevent the revolution of said member in unison with said shaft, a plurality of cylinders supported by said member, piston rods arranged to be operated by said cylinders connected to the clutch-operating mechanism, and means to control a supply of fluid to said cylinder.

2. The combination in a device of the class named, of a shaft, a clutch mounted thereon, a sustaining member mounted on and inclosing said shaft, means for preventing rotary and longitudinal movement of said member, said member being provided with extending brackets having recesses therein, cylinder bodies mounted in said recesses, heads for said cylinders, means for clamping said heads on said cylinders and said cylinders in said recesses, piston rods in said cylinders attached to the clutch-operating mechanism, and means to control a supply of fluid to said cylinders whereby said piston rods may be reciprocated to operate said clutch.

In testimony whereof I have hereunto set my hand in presence of two subscribing witnesses.

HORACE BRAINERD CAMP.

Witnesses:
C. E. HUMPHREY,
GLENARA FOX.